US012496604B1

(12) United States Patent
McCrady et al.

(10) Patent No.: US 12,496,604 B1

(45) Date of Patent: Dec. 16, 2025

(54) SYSTEMS AND METHODS FOR AUTOMATED MATERIAL APPLICATION RATE CONTROL

(71) Applicant: BMIC LLC, Dallas, TX (US)

(72) Inventors: Glen McCrady, Parisippany, NJ (US); Eliot Wall, Parisippany, NJ (US)

(73) Assignee: BMIC LLC, Dallas, TX (US)

( * ) Notice: Subject to any disclaimer, the term of this patent is extended or adjusted under 35 U.S.C. 154(b) by 3 days.

(21) Appl. No.: 18/645,077

(22) Filed: Apr. 24, 2024

Related U.S. Application Data

(60) Provisional application No. 63/502,536, filed on May 16, 2023.

(51) Int. Cl.
*B05B 13/04* (2006.01)
*B05B 12/08* (2006.01)
*B05B 12/12* (2006.01)

(52) U.S. Cl.
CPC .......... *B05B 12/084* (2013.01); *B05B 12/122* (2013.01); *B05B 13/04* (2013.01)

(58) Field of Classification Search
None
See application file for complete search history.

(56) References Cited

U.S. PATENT DOCUMENTS

| | | | | |
|---|---|---|---|---|
| 10,478,846 | B2 | 11/2019 | Franks et al. | |
| 11,124,926 | B2 | 9/2021 | Fennell et al. | |
| 11,440,042 | B2 | 9/2022 | Geisberger et al. | |
| 2013/0122186 | A1* | 5/2013 | Hoppel | B05D 1/00 118/712 |
| 2017/0312775 | A1* | 11/2017 | Franks | B05B 9/01 |
| 2019/0242069 | A1* | 8/2019 | Fennell | E01C 7/187 |
| 2020/0126259 | A1* | 4/2020 | Accessor | G06F 16/29 |
| 2020/0139394 | A1* | 5/2020 | She | B05B 12/10 |
| 2020/0206766 | A1* | 7/2020 | Geisberger | B05B 12/00 |
| 2022/0117151 | A1* | 4/2022 | Lamprecht | A01M 7/005 |
| 2022/0241810 | A1* | 8/2022 | Wang | B05B 12/004 |

* cited by examiner

*Primary Examiner* — Charles Capozzi
(74) *Attorney, Agent, or Firm* — GREENBERG TRAURIG, LLP

(57) ABSTRACT

Systems and methods of the present disclosure include improved coating of worksurfaces by accessing a digital map of a project site, the project site having the work surface, and identifying one or more sub-areas of the work surface, the sub-areas being associated with an observed or expected wear pattern on the work surface. Based on the wear pattern, a coating technology and a dry film thickness (DFT) is determined for each sub-area based at least in part on the wear pattern of each sub-area, which is mapped onto a digital map of the project site to assign the coating technology and the DFT to each sub-area within the project site. The digital map is provided to an autonomous vehicle to automatically apply the coating technology across the work surface to achieve the DFT.

20 Claims, 7 Drawing Sheets

SYSTEMS AND METHODS FOR AUTOMATED MATERIAL APPLICATION RATE CONTROL

CROSS-REFERENCE TO RELATED APPLICATIONS

This application claims priority to U.S. Provisional Application No. 63/502,536 filed on 16 May 2023 and entitled "SYSTEMS AND METHODS FOR AUTOMATED MATERIAL APPLICATION RATE CONTROL," and is herein incorporated by reference in its entirety.

FIELD OF TECHNOLOGY

The present disclosure generally relates to computer-based systems and/or methods configured for automated material application rate control, including for coating technologies applied to work surfaces to achieve an optimal dry film thickness.

BACKGROUND OF TECHNOLOGY

Many different types of coating application equipment are not optimized for surface coating products and for the project load cells common to the target applications that are. There may also be a gap in the ability to control quality since the application rate (and hence coating film thickness) is typically not controlled, which creates insufficient thickness causing the potential for premature wear-through and/or excess thickness resulting in lost price-competitiveness. Moreover, applying the correct coating film thickness to the correct area typically requires manual application. The labor required to fulfill complex designs using current methods is both expensive and time consuming.

SUMMARY

In some aspects, the techniques described herein relate to a method, including: accessing, by at least one processor, a digital map of a project site, the project site having a work surface in at least one area of the project site; identifying, by the at least one processor, at least one sub-area of the area, where the at least one sub-area is associated with at least one wear pattern on the work surface; determining, by the at least one processor, at least one coating technology and at least one dry film thickness (DFT) for the at least one sub-area based at least in part on the at least one wear pattern of the at least one sub-area; and mapping, by the at least one processor, the at least one sub-area onto a digital map of the project site to assign the at least one coating technology and the at least one DFT to the at least one sub-area within the project site.

In some aspects, the techniques described herein relate to a method, further including: obtaining, by the at least one processor, during a first time period prior to a start of application of the at least one coating technology to the project site, at least one measurement of at least one parameter of an operation of a vehicle configured to apply the at least one coating technology to the at least one sub-area; and generating, by the at least one processor, a calibrated baseline of operation of the vehicle based at least in part on the at least one measurement.

In some aspects, the techniques described herein relate to a method, further including: obtaining, by the at least one processor, in response to the application of the at least one coating technology to the project site, at least one subsequent measurement of the at least one parameter of the operation of the vehicle; and determining, by the at least one processor, an anomaly in the operation of the vehicle based at least in part on a comparison of the at least one subsequent measurement and the calibrated baseline of operation of the vehicle.

In some aspects, the techniques described herein relate to a method, further including: modelling, by the at least one processor, with at least one model, the at least one measurement of the at least one parameter to generate the calibrated baseline.

In some aspects, the techniques described herein relate to a method, where the least one model includes at least one of at least one statistical model for at least one machine learning model.

In some aspects, the techniques described herein relate to a method, where the wear pattern includes at least one of observed wear on an existing coating of the work surface or a predicted wear on a to-be-applied coating.

In some aspects, the techniques described herein relate to a method, further including: determining, by the at least one processor, a quantity of the at least one coating technology to be deposited per distance to achieve the at least one DFT in the at least one sub-area; determining, by the at least one processor, a vehicle speed and a pump motor speed based at least in part on the quantity; and mapping, by the at least one processor, the vehicle speed and the pump motor speed to the at least one sub-area of the project site so as to achieve the at least one DFT in the at least one sub-area.

In some aspects, the techniques described herein relate to a method including: receiving, by at least one processor, at least one digital map of a project site, where the at least one digital map maps at least one sub-area of an area of a work surface onto the project site; where the at least one sub-area includes at least one assignment of at least one coating technology and at least one dry film thickness (DFT) based on at least one wear pattern of the at least one sub-area; converting, by the at least one processor, a first coordinate system of the digital map to a project site-specific coordinate system; monitoring, in real-time, by the at least one processor, a location of a material application vehicle using at least one radio system configured to obtain location data from at least one satellite positioning system; controlling, by the at least one processor, the material application vehicle, based on the location, to: traverse the work surface according to the digital map based at least in part on the project site-specific coordinate system; apply the at least one coating technology to the at least one sub-area assigned to the at least one coating technology based at least in part on the digital map and the location; receiving, by the at least one processor, sensor data from at least one sensor configured to measure at least one application rate of the at least one coating technology; determining, by the at least one processor, at least one measured DFT of the at least one coating technology based at least in part on the sensor data; determining, by the at least one processor, the at least one DFT at the location of the material application vehicle based at least in part on the digital map; and adjusting, in real-time, by the at least one processor, an application rate of the at least one coating technology based at least in part on the location, the digital map and the at least one measured DFT.

In some aspects, the techniques described herein relate to a method, further including: obtaining, by the at least one processor, during a first time period at a start of applying the at least one coating technology to the project site, at least one measurement of at least one parameter of an operation of the material application vehicle configured to apply the at least one coating technology to the at least one sub-area; and generating, by the at least one processor, a calibrated baseline of operation of the material application vehicle based at least in part on the at least one measurement.

In some aspects, the techniques described herein relate to a method, further including: obtaining, by the at least one processor, after the first time period, at least one subsequent measurement of the at least one parameter of the operation of the material application vehicle; and determining, by the at least one processor, an anomaly in the operation of the material application vehicle based at least in part on a comparison of the at least one subsequent measurement and the calibrated baseline of operation of the vehicle.

In some aspects, the techniques described herein relate to a method, further including: modelling, by the at least one processor, with at least one model, the at least one measurement of the at least one parameter to generate the calibrated baseline.

In some aspects, the techniques described herein relate to a method, where the least one model includes at least one statistical model.

In some aspects, the techniques described herein relate to a method, where the at least one model includes at least one machine learning model.

In some aspects, the techniques described herein relate to a method, further including: determining, by the at least one processor, a quantity of the at least one coating technology to be deposited per distance to achieve the at least one DFT in the at least one sub-area; determining, by the at least one processor, a vehicle speed and a pump motor speed based at least in part on the quantity; and controlling, by the at least one processor, the material application vehicle, based on the vehicle speed and the pump motor speed in the at least one sub-area of the project site so as to achieve the at least one DFT in the at least one sub-area.

In some aspects, the techniques described herein relate to a system including: at least one processor in communication with at least one non-transitory computer readable medium having computer software instructions stored thereon, where the at least one processor, upon execution of the computer software instructions is configured to: receive at least one digital map of a project site, where the at least one digital map maps at least one sub-area of an area of a work surface onto the project site; where the at least one sub-area includes at least one assignment of at least one coating technology and at least one dry film thickness (DFT) based on at least one wear pattern of the at least one sub-area; convert a first coordinate system of the digital map to a project site-specific coordinate system; monitor, in real-time, a location of a material application vehicle using at least one radio system configured to obtain location data from at least one satellite positioning system; control the material application vehicle, based on the location, to: traverse the work surface according to the digital map based at least in part on the project site-specific coordinate system; apply the at least one coating technology to the at least one sub-area assigned to the at least one coating technology based at least in part on the digital map and the location; receive sensor data from at least one sensor configured to measure at least one application rate of the at least one coating technology; determine at least one measured DFT of the at least one coating technology based at least in part on the sensor data; determine the at least one DFT at the location of the material application vehicle based at least in part on the digital map; and adjust, in real-time, an application rate of the at least one coating technology based at least in part on the location, the digital map and the at least one measured DFT.

In some aspects, the techniques described herein relate to a system, where the at least one processor, upon execution of the computer software instructions is further configured to: obtain, during a first time period at a start of applying the at least one coating technology to the project site, at least one measurement of at least one parameter of an operation of the material application vehicle configured to apply the at least one coating technology to the at least one sub-area; and generate a calibrated baseline of operation of the material application vehicle based at least in part on the at least one measurement.

In some aspects, the techniques described herein relate to a system, where the at least one processor, upon execution of the computer software instructions is further configured to: obtain, after the first time period, at least one subsequent measurement of the at least one parameter of the operation of the material application vehicle; and determine an anomaly in the operation of the material application vehicle based at least in part on a comparison of the at least one subsequent measurement and the calibrated baseline of operation of the vehicle.

In some aspects, the techniques described herein relate to a system, where the at least one processor, upon execution of the computer software instructions is further configured to: model, with at least one model, the at least one measurement of the at least one parameter to generate the calibrated baseline.

In some aspects, the techniques described herein relate to a system, where the least one model includes at least one of: at least one statistical model, or at least one machine learning model.

In some aspects, the techniques described herein relate to a system, where the at least one processor, upon execution of the computer software instructions is further configured to: determine a quantity of the at least one coating technology to be deposited per distance to achieve the at least one DFT in the at least one sub-area; determine a vehicle speed and a pump motor speed based at least in part on the quantity; and control the material application vehicle, based on the vehicle speed and the pump motor speed in the at least one sub-area of the project site so as to achieve the at least one DFT in the at least one sub-area.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
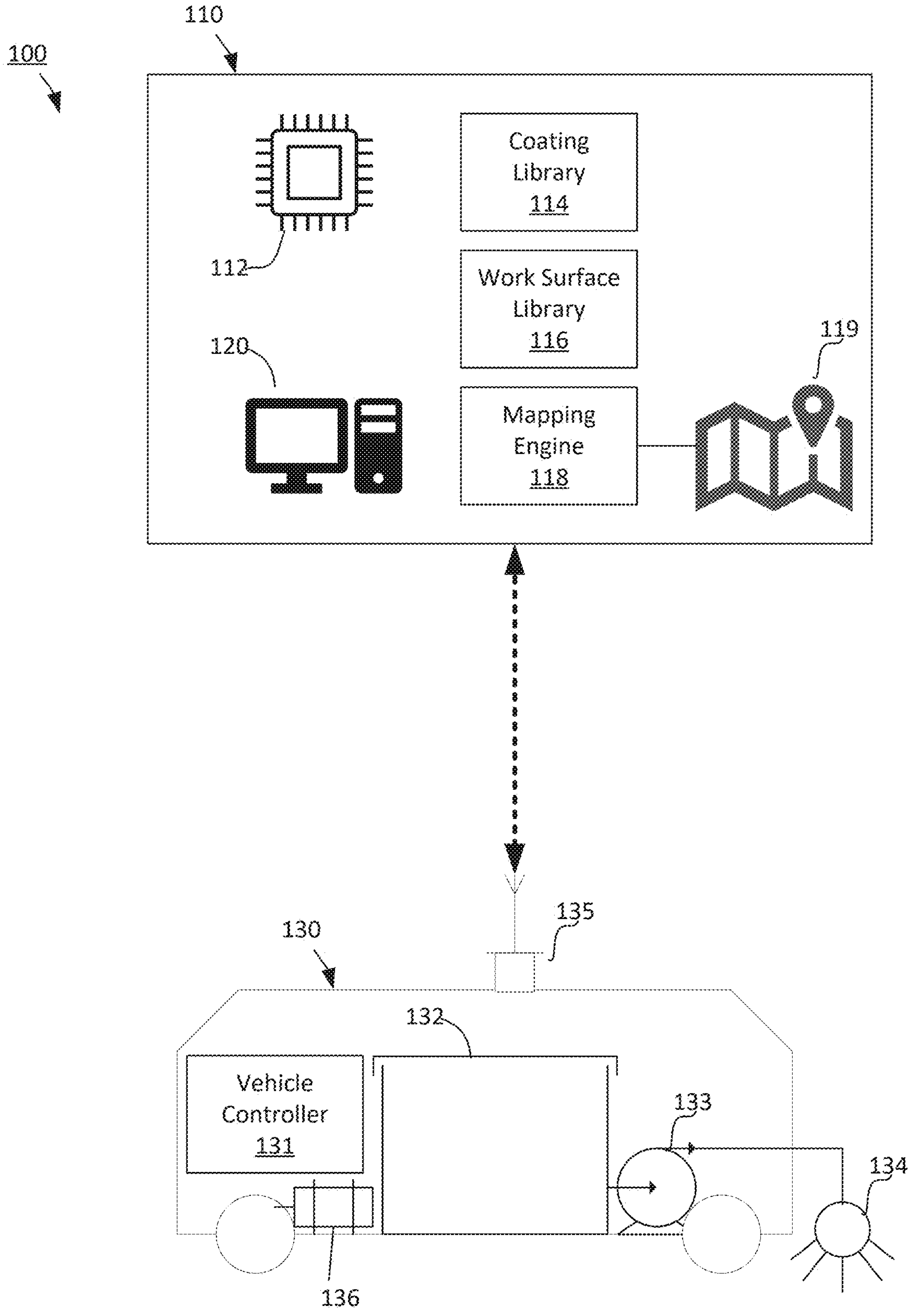
FIGS. 1 through 7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Many different types of coating application equipment are not optimized for surface coating products and for the project load cells common to the target applications that are. There may also be a gap in the ability to control quality since the application rate (and hence coating film thickness) is typically not controlled, which creates insufficient thickness causing the potential for premature wear-through and/or excess thickness resulting in lost price-competitiveness. Moreover, applying the correct coating film thickness to the correct area typically requires manual application. The labor required to fulfill complex designs using current methods is both expensive and time consuming.

In some embodiments, wear-through can be caused by one or more modes of failure, such as, UV (solar) radiation, abrasion, weathering, among others or any combination thereof. Indeed, in the asphalt and/or pavement application, pavement coatings wear more from abrasion than weathering. Thus, wear-through can vary by application area, as well as by sub-areas within the application area. For example, road markings on a particular side of a road and/or distance from an intersection may undergo different abrasion activities than another side or other distance from the intersection. In another example, some portions of a paved area may be more shaded than others, such as by trees, awnings, buildings, etc. Thus, coating film thickness may be optimized for the wear-through experienced at each sub-area within an application area.

Examples of application areas may include other paved, asphalt, concrete, stone, clay, brick, turf or other surfaces, such as, e.g., parking lots, streets, highways, playgrounds, plazas, bike lanes, bus lanes, courtyards, asphalt roofing, pool areas, walking and/or bike paths, among others or any combination thereof.

An automated process that connects CAD with application may provide a technical solution of improved applicator control, including automated application vehicle navigation, to automatically apply a coating according to a complex design for more precise and accurate coating film thickness optimized for specific portions of an application area by using application rate monitoring via particular sensor feedback, and/or via high resolution mapping and vehicle navigation. Such a technical solution addresses the technical problems of inconsistent and/or inaccurate application rate to achieve the optimized coating film thickness, the inability of typical technologies to vary application rate according to each portion of the application area, among others.

The present disclosure provides equipment, systems, application process, and other technology that enable coating application rate optimization at the sub-area level via an autonomous vehicle for optimized coating film thickness. Embodiments may include application rate control based on high resolution location determination and application rate monitoring via customized sensor equipment to ensure consistent and accurate application rate, design accuracy (e.g., as defined by color placement and/or cutting in of adjacent colors, etc.), quality finished appearance, target wear-through resistance, among other factors or any combination thereof.

In some embodiments, the equipment, systems, application process, and other technology may be configured to surface coating products such as, e.g., waterborne acrylic-epoxy coating, 2-part waterborne acrylic-epoxy coating, waterborne acrylic-epoxy texture coating, 2-part waterborne acrylic-epoxy texture coating, methyl methacrylates (MMA) coating, MMA coating with added aggregate, among other coating types or any combination thereof.

Referring to FIG. 1, a material application system 100 having a configuration device 110 and a material application vehicle 130 is depicted in accordance with one or more embodiments of the present disclosure.

In some embodiments, generally, higher performance coating products may wear unevenly with wear rates directly related to the amount of abrasion an area is exposed to. In some embodiments, a material application system 100 having a configuration device 110 and a material application vehicle 130 may enable a specification strategy that targets high wear areas for either more thickness of coating or a higher performance coating that provides better abrasion resistance. As a result, the use of more expensive coating technologies that deliver superior performance can be made much more economical by ensuring that the thickness of product applied can be optimized across the geometry of the project. Placing expensive material where it is not required unnecessarily increases cost.

Moreover, in some embodiments, different coating technologies may utilize different application equipment but there may be some common requirements (for example, measuring application rates). Accordingly, the material application system 100 may employ a modular approach to enable the material application vehicle 130 to be outfitted with modules on top of technology-agnostic components to accommodate a coating technology optimized for a particular project. For example, a technology-agnostic component may include application rate monitoring via weight measurements to monitor depletion. Thus, regardless of coating technology being used a weight-thickness profile may be applied to use one component to monitor application rate with any of one or more coating technologies.

Accordingly, in some embodiments, the configuration device 110 may be used generate a project site-specific configuration for optimized coating application on a work surface of a project site. In some embodiments, the configuration device 110 may include and/or be incorporated into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the configuration device 110 may include and/or be incorporated into at least one server, which may include any service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, a processor 112 of the configuration device 110 may employ data from a data store, including, e.g., a coating library 114, a work surface library 116 and/or a mapping engine 118 to generate the project site-specific configuration for a particular project based on predefined profiles of work surfaces, coating technologies, and digital mapping of project sites. In some embodiments, the processor 112 may include, but is not limited to, any one or more of processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the libraries in the data store may include profiles that specify requirements, capabilities and other characteristics of each item in the libraries. In particular, the coating library 114 may include a catalog of coating technologies, including coating products, compounds, mixtures, types, etc. In some embodiments, the coating technologies may include particular coating products, such as particular sealant, paint, lamination, or other product or any combination thereof. In some embodiments, the coating technologies may include particular coating types, such as types of material used in the coating, type of the coating (e.g., paint, sealant, lamination, protectant, etc.), among others or any combination thereof. In some embodiments, the coating technologies may include particular compounds and/or mixtures, including one or more materials, powders, fluids, among others or any combination thereof. In some embodiments, the coating library 114 may maintain a coating profile for each coating technology. The coating profile may include, e.g., wear-through performance ratings, UV resistance, abrasion resistance, color, reflectivity, patterning, texture/surface roughness, viscosity, dry film texture, density or specific weight/mass, dry time, cure time, surface compatibility (e.g., on what work surfaces the coating technology may be applied), cost, among other characteristics or any combination thereof.

In some embodiments, the coating profiles may be user defined, e.g., via user input at a configuration console 120, externally sourced (e.g., from a remote database and/or service) via API or other interface, automatically generated, or any combination thereof. In some embodiments, the configuration console 120 may include or be included within one or more remote or local computing device, including, but not limited to, at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, terminal, thin client, and so forth. In some embodiments, the computing device(s) and/or processor 112 may be part of the configuration console 120 in a single computing device In some embodiments, the work surface library 116 may include a catalog of work surface profiles that define characteristics of available work surfaces for application of one or more coating technologies. In some embodiments, the work surface profile of each work surface may include work surface attributes indicative of characteristics of a work surface type and/or the work surface of a particular project site, e.g., work surface material (e.g., asphalt, concrete, turf (e.g., sports fields), stone, wood, metal (iron, steel, aluminum, etc.), polymer, clay, brick, etc.), location, function and/or expected use (e.g., roadway, pedestrian walkway, playground, roofing material, plaza, building structure façade, etc.), wear-through characteristics (e.g., high or low abrasion area(s), high or low UV exposure area(s), high or low weather exposure area(s), among other wear-through categories and/or characteristics or any combination thereof), among other attributes of the work surface.

In some embodiments, the work surface profiles may be user defined, e.g., via user input at a configuration console 120, externally sourced (e.g., from a remote database and/or service) via API or other interface, automatically generated, or any combination thereof.

Accordingly, in some embodiments, a coating project may be configured for a particular project site by specifying coating technologies and/or work surfaces from the associated coating profile(s) and/or work surface profile(s), respectively. In some embodiments, for example, a user configuring the coating project may employ the configuration console 120 to define the coating project by selecting a work surface profile associated with the project site. The configuration device 110 may automatically filter the coating library 114 to present coating profiles for coating technologies suitable for the specified work surface. For example, the surface compatibility characteristic of each coating profile may be compared to the work surface material of the selected work surface profile to filter out incompatibility coating profiles. The user may then be presented with compatibility coating profiles such that the user may select a particular coating technology via selection in a graphical user interface of a particular coating profile. In some embodiments, the graphical user interface may provide the ability to selection one or more coating profiles for the coating project.

In some embodiments, the coating project may be associated with a particular geospatial location, such as an address, latitude-longitude coordinate(s), intersection, landmark, structure, etc. Accordingly, the mapping engine 118 may be utilized to generate a digital map 119 of the project site based on the geospatial location. In some embodiments, the geospatial location may be selected, e.g., by the user via the graphical user interface of the configuration console 120, or may be automatically determined based on, e.g., a project schedule specifying the particular project or a library of potential projects (e.g., stored as a work surface profile in the work surface library 116), or by another reference or any combination thereof. In some embodiments, the geospatial location may be obtained via the reference using, e.g., a remote system or stored in a log local to the configuration device 110, or by any other source or any combination thereof.

In some embodiments, the project site may include an area in which the work surface is positioned. Accordingly, the mapping engine 118 may map the area of the work surface onto a map of the geospatial location to create the digital map 119. For example, the area of the work surface may span dimensions, e.g., in each cardinal direction, relative to a landmark or address, relative to an intersection, relative to a mile marker, relative to beacon device positioned at the project site, or by any other technique for mapping the area within the project site. In some embodiments, the dimensions may include, e.g., distance units (miles, yards, feet, inches, kilometers, meters, centimeters, millimeters, etc.), coordinates of latitude and/or longitude (degrees, minutes, etc.), or other dimension or any combination thereof.

In some embodiments, portions or sub-areas within the area of the working surface may have particular uses/needs related to the coating technology, such as road lane markings, sports field lines, asphalt sealant, wood sealant, metal anti-corrosion protection, high visibility paint, decoration, reflective surfacing, among others or any combination thereof. In some embodiments, the uses/needs of the sub-areas may be pre-identified and/or algorithmically determined with one or more algorithms and/or machine learning models. In some embodiments, the user may instruct the mapping engine 118 via a mapping graphical user interface of the configuration console 120 to mark or otherwise identify sub-areas within the project site in the digital map 119 according to use/need related to the coating technology.

In some embodiments, portions or sub-areas within the area of the working surface may have particular wear patterns, which may be observed and/or expected patterns of wear, such as increased vehicle traffic, increased foot traffic, increased exposure to the sun (UV exposure), increased exposure to weathering, among other differences in wear. In some embodiments, the sub-areas may be pre-identified and/or algorithmically determined with one or more algorithms and/or models, including machine learning models, statistical models or any combination thereof. In some embodiments, the user may instruct the mapping engine 118 via the mapping graphical user interface of the configuration console 120 to mark or otherwise identify sub-areas within the project site in the digital map 119 according to wear patterns. Thus, the user may demarcate one or more sub-areas for a particular degree of wear via one or more wear-through modes, and one or more sub-areas for a different degree of wear via one or more wear-through modes. Thus, for each sub-area, the user may select or otherwise input the wear-through mode and/or degree of wear, which may vary across the sub-areas or be the same across the sub-areas, or a combination thereof.

As a result, in some embodiments, the mapping engine 118 may modify the digital map 119 to map a digital representation of the project site at the geographic location of the project site, and the wear pattern for each sub-area within an area of the working surface for which a coating technology is to be applied. In some embodiments, the wear pattern may be correlated to requirements for the wear coating. For example, the wear coating may be correlated to particular requirements for, e.g., durability, wear resistance, weather resistance, color, reflectivity, patterning, texture/surface roughness, etc.

In some embodiments, the wear pattern may also be correlated to a dry film thickness of the coating technology. For any given coating technology, a particular minimum thickness of the coating once dry (dry film thickness, or DFT) may be needed to survive a minimum period of time under the wear pattern. The minimum DFT of a coating technology may be determined based on the wear pattern and the durability and/or resistance to abrasion, UV and/or weathering of the coating technology. Thus, the mapping engine 118 may implement a minimum DFT algorithm to determine a minimum DFT for each sub-area based on the wear pattern of each sub-area.

Similarly, in some embodiments, the mapping engine 118 may modify the digital map 119 to map the digital representation of the project site at the geographic location of the project site, and the use/need of each sub-area. The use/need of each sub-area may be correlated to requirements for the wear coating, such as, e.g., color, reflectivity, material, texture, among others or any combination thereof.

Therefore, in some embodiments, the mapping engine 118 may use the wear pattern and/or use/need of each sub-area to identify a coating profile in the coating library 114 that has attributes that match the wear pattern and/or use/need. In some embodiments, the user may provide the coating technology of each sub-area to the mapping engine 118 such that the mapping engine 118 may map the coating technology to the associated sub-areas in the digital map 119. In some embodiments, the mapping engine 118 may automatically identify the most likely coating technology for each sub-area based on the wear-pattern (e.g., the wear mode and/or the degree of wear) and the wear-through performance ratings, UV resistance, abrasion resistance, color, or other characteristic or any combination thereof. In some embodiments, the mapping engine 118 may match the coating technology to a sub-area using, e.g., filtering, machine learning, or other matching technique or any combination thereof.

In some embodiments, the mapping engine 118 may be configured to utilize one or more exemplary AI/machine learning techniques for selecting sub-areas, identifying wear patterns, determining the minimum DFT, and/or selecting coating technologies. the mapping engine 118 may input into a mapping and/or wear pattern prediction model pipeline, including, e.g., project site characteristics, such as imagery, ground penetrating radar, sonar, LiDAR, among other direct and/or indirect sensing technologies. The model pipeline may use, e.g., computer vision and/or other imaging and/or spatial machine learning prediction algorithm to determine characteristics such as cracks (e.g., a number of cracks, length, width, depth and/or orientation), graveling of the surface (e.g., texturing indicative of a loss of smaller particles, leaving behind larger particles), coloring, among other features indicative of a current or future risk of wear to the surface. The model pipeline may generate a prediction of a wear risk, including a likelihood, severity and/or timeline of wear of the work surface, e.g., in each sub-area. The model pipeline may then predict the wear pattern of each sub-area, the coating profile, DFT and/or material for each sub-area.

In some embodiments, the model pipeline may employ one or more machine learning models, statistical models, and/or algorithms to determine the current or expected wear pattern, the coating technology, the coating profile, the DFT, among other coating parameters or any combination thereof. The AI/machine learning techniques may be chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
c. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the machine learning/AI techniques may employ external inputs, such as traffic, weather, wear rate imagery, and other inputs to determine the wear pattern at any given sub-area in a particular project site. In some embodiments, the imagery may be satellite imagery, drone imagery, manual imagery at the ground level, among other types of imagery or any combination thereof.

In some embodiments, the coating library 114 and/or the work surface library 116 may include or be stored in the data store. In some embodiments, the data store may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data store may, additionally or alternatively, include one or more temporary storage devices such as, e.g., a random-access memory, cache, buffer, or other suitable memory device, or any other data store and combinations thereof.

In some embodiments, in the case of a database, depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages. The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the user may employ the configuration console 120 to create and/or edit the digital map 119 for the project. In some embodiments, as detailed above, the digital map 119 may digitally represent the location of the project side, the work surface in the project site and each sub-area of the project site, including the coating technology and/or DFT of a coating technology assigned to each sub-area. Therefore, the user may instruct the configuration device 110 to communicate the digital map 119 to the material application vehicle 130.

Therefore, in some embodiments, in response to the instruction, the configuration console 120 may automatically copy from the coating library 114 the coating profile associated with each sub-area of the digital map 119, and communicate the coating profile(s) and the digital map to a vehicle controller 131 of the material application vehicle 130 via one or more wired and/or wireless communication mediums. For example, the material application vehicle 130 may be connected to the configuration device 110 via one or more wired and/or wireless communication technologies, such as, e.g., USB, Fire Wire, Thunderbolt, Serial ATA, Parallel ATA, Ethernet, CAN, Bluetooth, WiFi, ZigBee, Z-Wave, LoRAN, Thread, NFC, or any other communication medium. In some embodiments, the material application vehicle 130 may be connected to the configuration device 110 via one or more local and/or wide area access networks, such as an intranet or the internet.

In some embodiments, the configuration, including the digital map 119, may be communicated from the configuration device 110 to the material application vehicle 130 via, e.g., a suitable application programming interface (API), messaging protocol, or other communication technology. In some embodiments, the configuration may be communicated across, e.g., a direct interface between the configuration device 110 and the material application vehicle 130 or across a network (such as a local area network (LAN), wide area network (WAN), Internet, intranet, or other network and combinations thereof), or a combination thereof. In some embodiments, the connection may include, e.g., hard wired connections (e.g., fiber optic cabling, coaxial cabling, copper wire cabling, ethernet, etc.), wireless connections (e.g., WiFi, Bluetooth, Zigbee, Z-Wave, cellular networking such as 5G, 4G, Long Term Evolution (LTE), 3G, High-Speed Downlink Packet Access (HSPA), Global System for Mobile Communications (GSM), Code-division multiple access (CDMA) or other technologies, and combinations thereof), or combination thereof.

In some embodiments, one or more interfaces may utilize one or more software computing interface technologies, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, the configuration device 110 may be integrated into the material application vehicle 130 such that the digital map 119 and the coating profile(s) may be communicated to the vehicle controller 131 via one or more hardware and/or software interfaces.

In some embodiments, the material application vehicle 130 may include a robotic and/or autonomous vehicle. In some embodiments, in addition to providing the digital map 119 and the coating profile(s) to the vehicle controller 131, the configuration console 120 may be used to configure, e.g., via the configuration device 110, parameters of operation of one or more components of the material application vehicle 130.

In some embodiments, the material application vehicle 130 may include, e.g., a motor, a tank 132, a pump 133, an applicator 134 and/or a radio system 135. For example, the material application vehicle 130 may be managed by with the configuration console 120 or other device, e.g., with a dedicated, smart app that enables to user to easily manage all relevant parts of the automatic material application onto the work surface.

In some embodiments, the motor 136 may include an electric motor, internal combustion engine, or a hybrid electric-internal combustion drive system. The motor 136 may provide power to the wheels of the material application vehicle 130 to propel the material application vehicle 130 under control by the vehicle controller 131. In some embodiments, parameters of the motor 136 may include, e.g., acceleration tuning, steering response, braking response, top speed, minimum speed, among other parameters or any combination thereof.

In some embodiments, the tank 132 may include a metal and/or polymer vessel for holding the coating technology to be applied to the work surface. In some embodiments, the tank 132 may include components for material mixing, agitation and storage before, during and after application. For example, the tank 132 may provide agitation where required for initial product mixing and/or maintaining consistent blending (including aggregate). Thus, the tank 132 may include, e.g., an internal mixing actuator, a vibrating attachment to cause the tank 132 to vibrate, or other mixing component or any combination thereof. In some embodiments, the tank 132 may be equipped with one or more sensors to monitor a fill level and/or consumption rate of the coating technology. For example, a sensor may include a load cell to convert a force such as tension, compression, pressure, or torque into an electrical signal that can be measured and standardized, and in particular, weight or mass of the tank 132 during application. As such, the parameters of the tank 132 (e.g., and the sensors thereof), may include sensor operation parameters such as calibration and/or sensitivity, and/or mixing/agitation component parameters such as agitation frequency, speed and/or amplitude, among others or any combination thereof.

In some embodiments, the coating technology may be moved from the tank 132 to the applicator 134 for application to the work surface via a pump 133. In some embodiments, the pump 133 may include a fluid pumping mechanism, such as, e.g., a positive displacement pump, an impulse pump, a velocity pump, a gravity pump, a steam pump, a valveless pump, or other pump configured to pump fluids of a range of viscosities. For example, the pump 133 may be configured to pump coating technologies such as waterborne, thermoplastic and/or MMA coatings. Thus, the pump 133 may have parameters including, e.g., discharge pressure, valve timing, rotor speed, stroke length, stroke speed, among others or any combination thereof.

In some embodiments, the applicator 134 may include one or more applicator types and/or applicator plumbing paths. In some embodiments, the tank 132 may include multiple vessels for multiple coating technologies. For example, a work surface may have multiple sub-areas having different coating technologies. To enable the material application vehicle 130 to apply the coating technology to all sub-areas without replacing or swapping coating technologies during the project, thus reducing down-time, the multiple coating technologies may be stored in the tank 132 at once. Accordingly, the applicator 134 may provide spray nozzles and/or plumbing to dynamically switch between multiple coating technologies and/or to apply multiple coating technologies concurrently.

Thus, in some embodiments, the applicator 134 may include one or more fluid paths, including plumbing, valving and/or nozzles. In some embodiments, the nozzles may include, e.g., one or more spray heads, one or more spray bars, one or more nozzles for textured coating application, one or more nozzles for airless coating application, one or more nozzles configured for MMA coating technologies, one or more nozzles configured for waterborne coating technologies, one or more nozzles for polymer coating technologies, one or more nozzles configured for one or more viscosities of coating technologies, among other nozzles configured for various characteristics of coating technologies.

In some embodiments, the valves may include, e.g., one or more spray heads, one or more spray bars, one or more valves for textured coating application, one or more valves for airless coating application, one or more valves configured for MMA coating technologies, one or more valves configured for waterborne coating technologies, one or more valves for polymer coating technologies, one or more valves configured for one or more viscosities of coating technologies, among other valves configured for various characteristics of coating technologies.

In some embodiments, the pipe flow paths may include, e.g., one or more spray heads, one or more spray bars, one or more pipe flow paths for textured coating application, one or more pipe flow paths for airless coating application, one or more pipe flow paths configured for MMA coating technologies, one or more pipe flow paths configured for waterborne coating technologies, one or more pipe flow paths for polymer coating technologies, one or more pipe flow paths configured for one or more viscosities of coating technologies, among other pipe flow paths configured for various characteristics of coating technologies.

In some embodiments, the applicator 134 may be modular where the valve(s), pipe flow path(s) and/or nozzle(s) may be removable from the material application vehicle 130. In some embodiments, the modular valve(s), pipe flow path(s) and/or nozzle(s) may include a module having a particular combination of valve(s), pipe flow path(s) and/or nozzle(s) configured for each coating technology (e.g., based on viscosity, material type, texture, color, reflectivity, etc.). In some embodiments, the valve(s), pipe flow path(s) and/or nozzle(s) may each be modular to configure the applicator 134 to the coating technology being applied. In some embodiments, the module(s) of the applicator 134 may be provided as a combination of modules configured for multiple coating technologies.

In some embodiments, therefore, the applicator 134 may be configured, or be preconfigured, for the coating technologies of the project. In some embodiments, the user may, e.g., via the configuration console 120, specify the coating technologies of the project and/or identify a vessel in the tank 132 filled with each coating technology. In some embodiments, the identification of the coating technologies may be automatic based on the digital map 119 and the coating profile(s) received from the configuration device 110. As a result, in some embodiments, the vehicle controller 131 may control the motor 136, the pump 133 and/or the applicator 134 to controllably apply each coating technology in each sub-area of the work surface based on the digital map 119, a real-time location of the material application vehicle 130, speed of the material application vehicle 130 (e.g., based on control of the motor 136), characteristics of each coating technology based on each coating profile (e.g., viscosity, expected DFT, etc.), feedback from the sensor(s) of the tank 132 to assess application rate, among other factors. Accordingly, the vehicle controller 131 may control and monitor application of each coating technology to ensure each coating technology is applied to the correct sub-area to the correct DFT based on the digital map 119 to ensure that the resulting coating is uniform and has even wear meeting a minimum lifetime, as detailed above.

In some embodiments, the vehicle controller 131 may utilize the feedback from the sensor(s) of the tank 132 and/or the location, speed and other data to report application of DFT for quality assurance and compliance with the project and the configuration provided by the digital map 119. Thus, the vehicle controller 131 may store the application rate determined from the sensor(s) feedback and the vehicle speed and location. The application rate may store in a non-transitory memory of the vehicle controller 131 for later access and retrieval. In some embodiments, alternatively or in addition, the vehicle controller 131 may transmit the application rate and/or DFT to the configuration device 110 or other computing device and/or server.

In some embodiments, the vehicle controller 131 may use the radio system 135 to receive the digital map 119 via wireless communication and transmit the application rate and/or DFT of application via wireless communication. In some embodiments, the radio system 135 may include at least one antenna. As used herein, the term "antenna" or "antennae" can refer to a device that is part of a transmitting or receiving system to transmit or receive wireless signals. In some embodiments, signals may be produced and emitted by the antenna based on control by a receive, transmitter and/or transceiver according to one or more wireless communication protocols, e.g., as further detailed above.

In some embodiments, the radio system 135 may include hardware-based radio modules for interfacing with the configuration device 110 and/or a network. The radio modules may include circuitry for each of, e.g., amplifying, filtering, mixing, attenuating, etc. However, in some embodiments, the radio system 135 may employ SDR modules. An SDR module can be formed from hardware including a general-purpose processing device with software-based virtual signal processing components for amplifying, filtering, mixing, attenuating, etc. to produce the SDR through virtual means.

In some embodiments, a basic SDR module may include a processing device (e.g., CPU or GPU) equipped with an analog-to-digital converter, preceded by some form of RF front end. In some embodiments, the RF front end includes antennae (e.g., one or more dielectric antennae or other suitable antenna types) and a transceiver. Significant amounts of signal processing are handed over to the general-purpose processor, rather than being done in special-purpose hardware (electronic circuits). Such a design produces a radio which can receive and transmit widely different radio protocols based solely on the software used.

In some embodiments, the radio system 135 may also or alternatively include positioning system radio components. In some embodiments, the position system may include, e.g., any form of location tracking technology or locating method that can be used to provide a location of, for example, a particular computing device/system/platform of the present disclosure and/or any associated computing devices, based at least in part on one or more of the following techniques/devices, without limitation: image sensor/camera, accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For case, at times the above variations are not listed or are only partially listed; this is in no way meant to be a limitation.

In some embodiments, the vehicle controller 131 may control the motor 136, the tank 132, the pump 133 and the applicator 134 based on the digital map 119, the coating profile(s) and/or the location obtained by the radio system 135. To do so, the vehicle controller 131 may convert the digital map 119 from geospatial position to project site specific coordinates. For example, the digital map 119 may map the sub-areas of the digital map to locations relative to one or more key points and/or beacons, such as RFID beacons and/or physical landmarks. In some embodiments, the radio system 135 may determine the location within the project site according to the project site specific coordinates, e.g., using GPS, GNSS, RFID, camera-based position recognition, among other techniques or any combination thereof.

In some embodiments, based on the location within the project site specific coordinates and the coating and/or DFT of each sub-area, the vehicle controller 131 may modulate operating parameters of each of the motor 136, the tank 132, the pump 133 and the applicator 134 to control the application rate of the coating technology assigned to each sub-area is applied such that the DFT is achieved. Thus, the application rate is controllably customized for each sub-area based on the digital map 119 to ensure the DFT and coating technology throughout the project site is optimized for the wear pattern in each sub-area.

Figure 2:
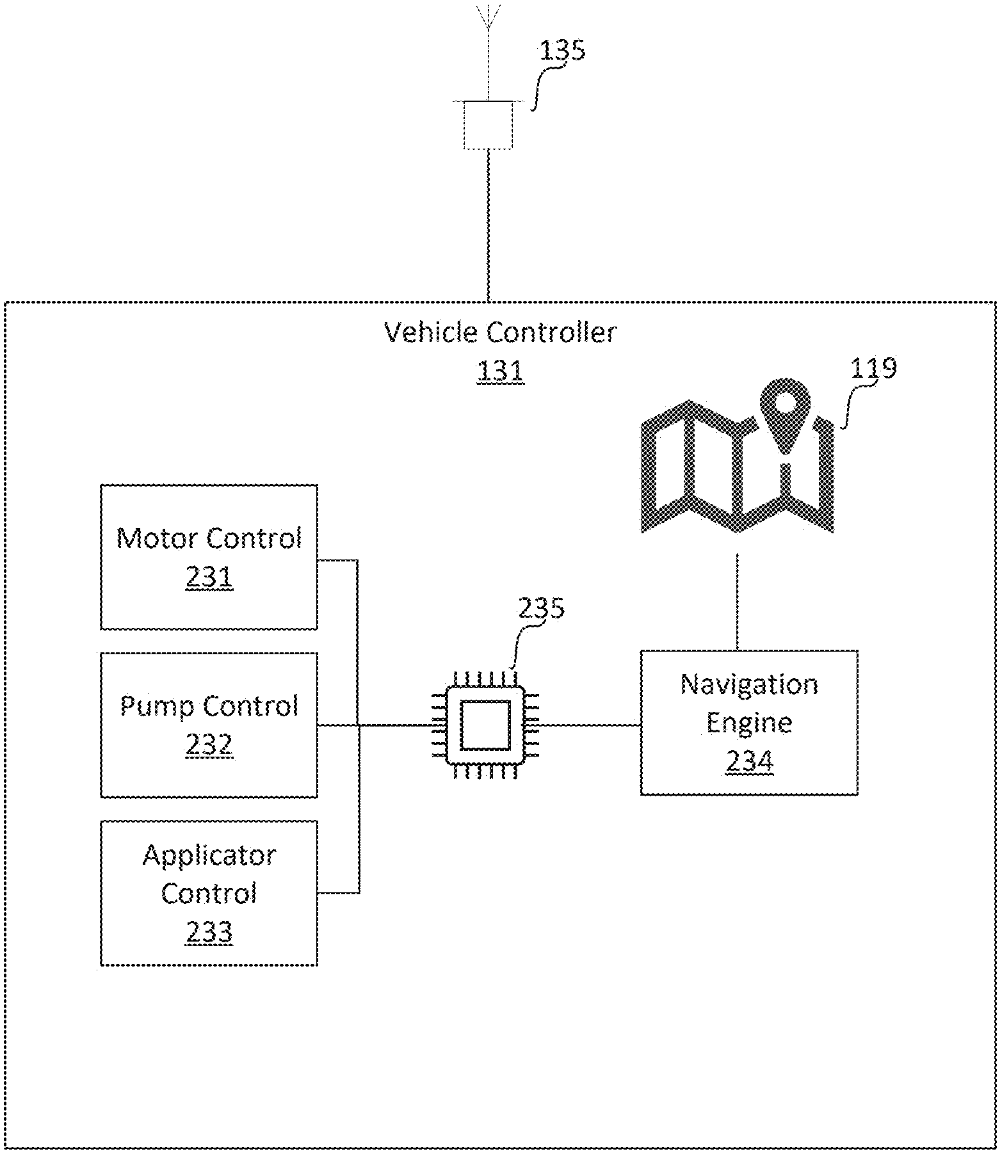

Referring to FIG. 2, an exemplary vehicle controller 131 is depicted in accordance with one or more embodiments of the present disclosure.

In some embodiments, the vehicle controller 131 may include motor control 231, pump control 232 and applicator control 233, each of which being configured to modulate operation and operational parameters of the motor 136, the pump 133 and the applicator 134, respectively. In some embodiments, the vehicle controller 131 may include hardware components such as a processor 235, which may include local or remote processing components. In some embodiments, the processor 235 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 235 may include data-processing capacity provided by the microprocessor. In some embodiments, the microprocessor may include memory, processing, interface resources, controllers, and counters. In some embodiments, the microprocessor may also include one or more programs stored in memory.

Similarly, the vehicle controller 131 may include a data store, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the data store may include, e.g., a suitable non-transient computer readable medium such as, e.g., random access memory (RAM), read only memory (ROM), one or more buffers and/or caches, among other memory devices or any combination thereof.

In some embodiments, the vehicle controller 131 may implement computer engines for the motor control 231, the pump control 232, the applicator control 233 and a navigation engine 234 to provide autonomous navigation instructions based on the digital map 119 received form the configuration device 110. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the navigation engine 234 may load the digital map 119 of the work surface and convert the digital map 119 from geospatial or other location coordinates to project site coordinates, e.g., using x and y axes by any other coordinate system or any combination thereof. Thus, the navigation engine 234 may translate position or location information of each sub-area into project site-specific positioning information to enable the vehicle controller 131 to control the components of the material application vehicle 130 to provide specified amounts of specified coating technology at specified locations on the project site, e.g., with dynamic feedback and control to ensure optimal DFT for the wear pattern of each sub-area.

To do so, in some embodiments, the navigation engine 234 may track a location in physical space, e.g., via the radio system 135, to locate the material application vehicle 130 and/or speed of the material application vehicle 130 as the material application vehicle 130 traverses the work surface of the project site. Thus, the navigation engine 234 may reference the digital map 119 in the project site-specific coordinates against the real-time location to determine instantaneous coating technology and application rate to apply to the work surface.

In some embodiments, the navigation engine 234 may locate the material application vehicle 130 using any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For case, at times the above variations are not listed or are only partially listed; this is in no way meant to be a limitation.

In some embodiments, the location tracking technology may be augmented with additional information for improved precision and accuracy, such as, e.g., RTK ("Real-Time Kinematic") enhanced satellite position system (e.g., global navigation satellite system (GNSS), Beidu, Glonass, global positioning system (GPS), among others or any combination thereof). The RTK enhanced satellite position system uses an RTK base station together with an RTK rover (in this case the material application vehicle 130) to filter and fine-tune the satellite position information to deliver accuracy on the order of centimeters or inches as opposed to feet, yards, meters, etc. of typical satellite position systems alone.

In some embodiments, based on the position information, the motor control 231 may control the motor 136 to traverse the work surface according to the digital map 119 based on the locations of the sub-areas of the work surface in the project site-specific coordinates. Traversal may include modulation of speed, steering, braking among other drive system functions so as to move from one sub-area to the next in continuous or intermittent fashion or a combination thereof.

In some embodiments, as the motor control 231 controls the motor to traverse the work surface, the pump control 232 may control the pump 133 to dispense an amount of coating technology based on the DFT and coating technology assigned to each sub-area in the digital map 119. Thus, as the material application vehicle 130 moves through a particular sub-area, the pump control 232 may use the position information to identify the sub-area in the digital map 119, extract the coating technology assigned to the sub-area, reference the coating technology characteristics (e.g., viscosity, pattern, reflectivity, color, expected film thickness relationship as detailed above, etc.), and determine a pump flow rate for which to pump the coating technology to achieve the optimal DFT of the sub-area.

In some embodiments, the sensor(s) of the tank 132 may provide feedback to the pump control 232 to monitor an actual application rate. In particular, in some embodiments, a load cell may measure the mass of the tank 132 as the pump 133 pumps the coating technology. Based on the change in mass over time, the pump control 232 may determine the actual application rate, which may be used to verify or correct the pump flow rate to ensure the correct application rate for the optimal DFT. Other sensors for application rate may be employed, such as flow sensor(s) measuring flow rate of the coating technology, optical sensor (s) (e.g., image sensor(s) or digital camera(s)) that measure, using computer vision algorithms, actual applied quantities of the coating technology to the work surface, among other sensors or any combination thereof.

In some embodiments, to adjust the application rate, the pump control 232 may adjust pump flow rate, the motor control 231 may modulate motor speed, or a combination thereof so as to adjust the quantity of coating technology applied per unit of distance traveled, and thus modulate the quantity applied at any given point.

In some embodiments, as the motor control 231 controls the material application vehicle 130 to traverse from one sub-area having a first coating technology (e.g., a first material, color, reflectivity, texture, etc.), to another with a second coating technology, the pump control 232 may modulate the pump 133 to pump the second coating technology instead of the first coating technology, e.g., by actuating one or more valves to switch to a second flow path carrying the second coating technology from a second vessel in the tank 132 from a first flow path carrying the first coating technology from a first vessel in the tank 132. Thus, the material application vehicle 130 may dynamically, and in real-time, switch between multiple coating technologies, and, in some embodiments, to one or more aggregate coating technologies that combine two or more of the multiple coating technologies. In some embodiments, the applicator control 233 may control valves in the applicator 134 to switch between and/or aggregate the multiple coating technologies based on the coating technologies assigned to the sub-area(s) of the instantaneous location of the material application vehicle 130.

In some embodiments, the motor control 213, the pump control 232 and/or the applicator control 233 may operate fully autonomously, or under operator control with a remote computing device (e.g., via the radio system 135), or any combination thereof.

In some embodiments, the application rate may be used to estimate the actual DFT of each coating technology in each sub-area. Thus, the vehicle controller 131 may store the actual DFT and/or application in a memory and/or data store to create reports of DFT for quality assurance and compliance with a coating plan/specification. In some embodiments, application rate may be assessed based on a frequency of polling of location, speed and/or application rate. The frequency may be, e.g., once per second (1 Hertz (Hz)), 2 Hz, 3 Hz, 4 Hz, 5 Hz, 10 Hz, 20 Hz, 100 Hz, or any other frequency in a range of 0.1 Hz to 300 Hz. At the completion of the project, the vehicle controller 131 may store a report of the application rate and/or DFT as a function of location. In some embodiments, the report may be communicated to the configuration console 120 and/or the configuration device 110, e.g., for quality assurance, retraining of one or more machine learning models (as detailed above), warranty compliance, research and development, marketing project location data for recoat promotions, among other uses or any combination thereof.

In some embodiments, the application rate may be a function of the rate at which material is discharged from each nozzle of the applicator and the speed at which the vehicle is moving. Moreover, the rate at which material is discharged may be a function of the viscosity of the material, the pressure of the material through the applicator, and the size of each tube and nozzle opening of the applicator. Accordingly, the application rate may be determined based on parameters such as the speed and/or pressure of the pump, the speed of the vehicle and the size of the nozzle openings.

In some embodiments, to ensure a desired DFT is achieved, the pump control 232 and the motor control 231 may provide feedback to each other to balance vehicle speed with pump speed based on characteristics of the material and/or nozzles. To do so, the pump control 232 and the motor control 231 may interoperate to attain a particular amount of material deposited on the work surface per distance travelled (e.g., volume or mass per unit distance). Thus, the material is deposit in a certain quantity that is configured to achieve the desired DFT.

For example, the pump control 232 may be configured to control the pump of the vehicle such that the pump causes a constant and/or predetermined pressure in the material based on characteristics of the material (e.g., viscosity and other fluid characteristics). As a result, the motor control 231 may modulate the speed of the vehicle to deposit a particular amount of material per distance of travel of the vehicle. In another example, the motor control 231 may be configured to maintain a particular speed of the vehicle, and based on the speed of the vehicle, the pump control 232 may be configured to modulate the speed of a motor of the pump to achieve a pressure of the material through the applicator that results in the particular amount of material per distance of travel. In another example, both the motor control 231 and the pump control 232 cooperate to balance the speed of the vehicle and the speed of the motor of the pump to achieve the particular amount of material per distance of travel.

Indeed, different scenarios (e.g., different terrains, surface types, work surface geometries, etc.) may result in constraints on vehicle speed. Thus, as the vehicle speed is adjusted based on the scenario, the pump control 232 may adjust the pressure of the material through the applicator (e.g., via varying the motor speed of the pump) to achieve the particular amount of material per distance of travel, thus compensating for the changes in vehicle speed.

Similarly, the pump may, for one or more reasons, have constraints on the speed at which the motor of the pump may operate, such as wear and degradation, increased material viscosity, degradation and wear in applicator plumbing and/or nozzles, blockages in the applicator plumbing and/or nozzles (e.g., foreign objects, build up of material, etc.), among other reasons for any combination thereof. Thus, the motor control 231 and/or pump control 232 may receive feedback including a measurement of material pressure at the pump, material pressure at one or more nozzles, pump speed, total material flow rate or volumetric change (e.g., via a measurement of a change in volume or mass of the material in the tank), among other feedback or any combination thereof. In response to the feedback, the motor control 231 may modulate the vehicle speed to compensate for the changes in application rate resulting from the conditions causing the feedback.

Additionally, the feedback may be used to detect faults or wear in the pump and/or applicator. The pump control 232 or other computing device (e.g., an external device for diagnostics and administration of the vehicle), may compare the feedback to a calibrated baseline. The calibrated baseline may represent the expected behavior of the vehicle, including the measurements, for a given material, of any one or more of material pressure at the pump, material pressure at one or more nozzles, pump speed, total material flow rate or volumetric change (e.g., via a measurement of a change in volume or mass of the material in the tank), among other parameters or any combination thereof. Thus, where there is a change greater than a predetermined threshold, an anomaly may be identified and output to a user device and/or user interface so as to alert a user of the anomaly.

In some embodiments, the anomaly may include a reduction in pressure of the material, total material flow rate or volumetric change that may indicate wear in the plumbing and/or nozzles of the applicator, an increase in pressure, total material flow rate or volumetric change that may indicate a blockage in the applicator, or other change or any combination thereof.

In some embodiments, the calibrated baseline may be formed in real-time as the pressures and pump operation are measured by one or more sensors. For example, the calibrated baseline may be formed in a first period of time associated with the operational lifetime of the vehicle or in a first period of time of the project, such that changes after the first period of time may be compared against the calibrated baseline in the first period of time. In some embodiments, the first period of time may be a testing period during, e.g., a first day, week, month, two months, three months or more of the operational lifetime of the vehicle. In some embodiments, the first period of time may be an initial period during, e.g., a first minute, two minutes, three minutes, four minutes, five minutes, six minutes, seven minutes, eight minutes, nine minutes, ten minutes or more at the start of the project.

In some embodiments, the calibrated baseline may be formed using one or more statistical and/or machine learning models. For example, the calibrated baseline may include, e.g., average, median and/or standard deviation of each parameter of the vehicle, a linear, logarithmic or other non-linear regression of each parameters, or other model or any combination thereof.

The parameters of the vehicle may be compared against the calibrated baseline in real-time during the project such that any anomalies can cause the vehicle controller 131 to pause, cancel or terminate the project by turning off the pump, the vehicle motor and/or the applicator. In some embodiments, the parameters of the vehicle may be logged during the project and then compared against the calibrated baseline after the project such that a user may initiate repairs or maintenance or otherwise take the vehicle out of service.

In some embodiments, the pressure in the applicator plumbing and/or nozzles may also affect the quality of the spray out of the nozzles (e.g., spread and uniformity of the spray). Thus, the pump control 232 may also or alternatively control the pump to maintain a quality of spray out of the nozzles by maintaining the pressure of the material via pump speed. For example, where the pressure falls below the baseline or other threshold, the pump control 232 may modulate the pump operation to raise the pressure and achieve the quality of the spray.

By increasing the pump speed to offset conditions causing a reduce pressure (e.g., nozzle wear) may result in increased flow rate of material out of the applicator. To compensate for the increase flow rate, the motor control 231 may increase the speed of the vehicle in order to achieve the same DFT.

Accordingly, in some embodiments, the material application vehicle 130 may autonomously traverse a project site to automatically apply one or more coating technologies to a work surface with the coating technology and at an application rate optimized for the wear pattern at any given location in the project site.

Figure 3:

Referring to FIG. 3, an example of multiple wear patterns across sub-areas of a work surface is illustrated in accordance with one or more embodiments of the present disclosure.

In some embodiments, pavement coatings wear much more from abrasion than weathering. In some embodiments, high performance pavement coatings represent a significantly greater proportion of total installed cost than traditional asphalt-based materials. Exposure to abrasive wear is not consistent across pavement surfaces and use cases. Higher wear areas tend to be less than 20% of the total and in many applications a significant portion of the area may be exposed to nearly zero abrasive wear.

In some embodiments, selectively applying more thickness (or more durable technology) in areas with greater exposure to abrasive wear rather than applying the same thickness to the entire surface reduces the average cost per square foot of the pavement coating. In some embodiments, selective application that is mapped to abrasion exposure enables the lowest cost for the longest maintenance cadence. The more precise the mapping, and the more accurately the required thickness is specified and delivered, the lower the cost for the same maintenance cadence.

In some embodiments, capturing performance versus DFT data over time provides valuable business value through: competitive advantage for sales through more accurate (cost effective) specifications which enables lower cost and more reliable warranty, and insights for research and development to optimize product improvement.

In some embodiments, FIG. 3 shows the impact of inconsistent application rates leading to inadequate product thickness and hence unacceptable service life. This project was installed 18 months prior to this image being taken. Much of the surface shows little to no wear but there are distinct areas where wear is visible and clearly in the pattern of the application process. At the time of application, the entire surface would have had the same color making it impossible to identify where an inadequate amount of material had been applied. The result of this is a call back for the contractor, and/or a warranty claim if this project carried a warranty, but also very importantly, a customer who is less likely to purchase the product again since the full promise of a longer maintenance cycle has not been realized.

Figure 4:
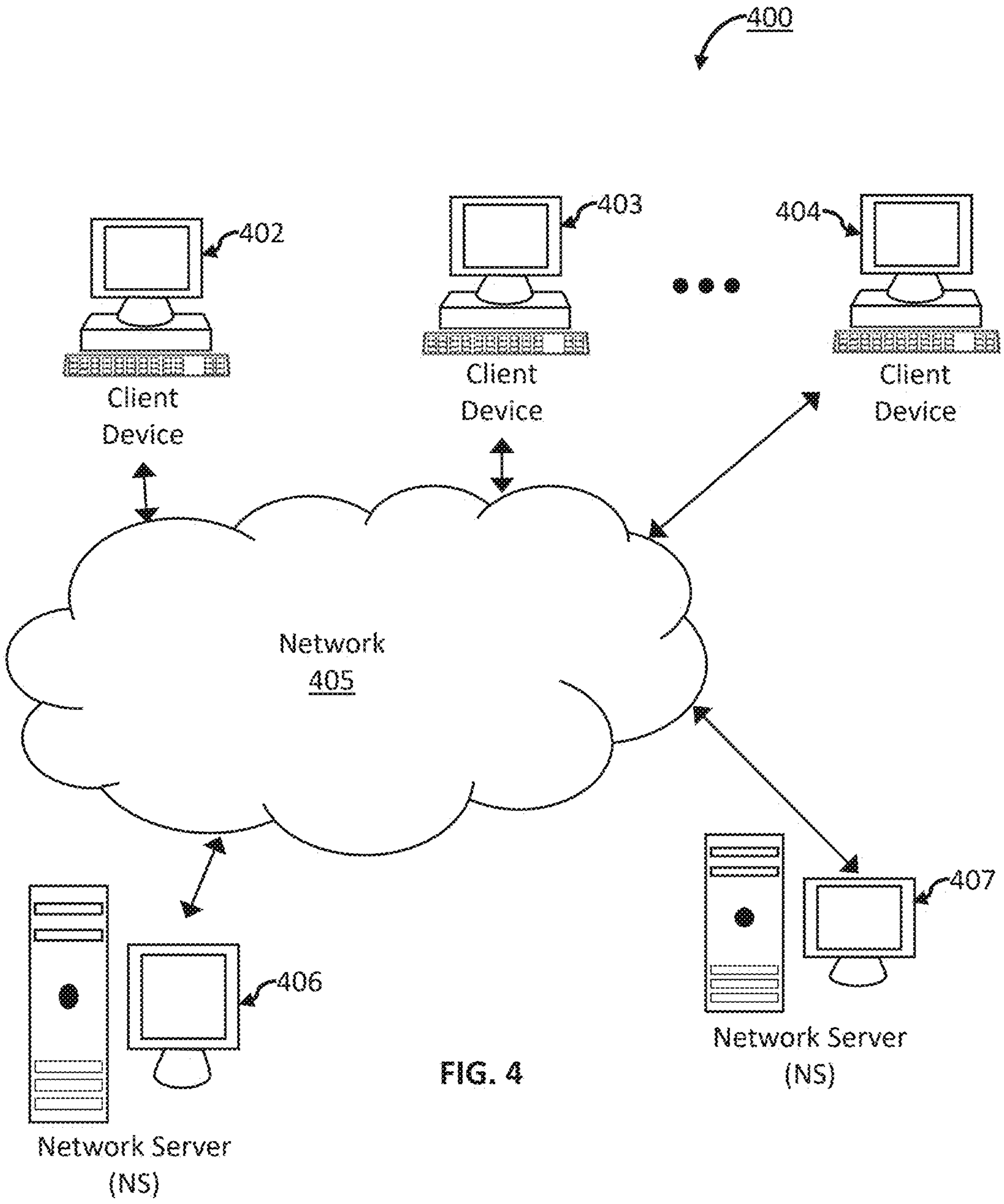

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, client device 402, client device 403 through client device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the client devices 402 through 404 may be personal computers, multiprocessor systems, microprocessor-based or programmable consumer electronics, network PCs, and the like. In some embodiments, one or more client devices within client devices 402 through 404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 402 through 404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 402 through 404 may include may run one or more applications, such as Internet browsers, mobile applications, voice calls, video games, videoconferencing, and email, among others. In some embodiments, one or more client devices within client devices 402 through 404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 402 through 404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 402 through 404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 401 through 404.

In some embodiments and, optionally, in combination of any embodiment described above or below, for example, one or more exemplary computing client devices 402 through 404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
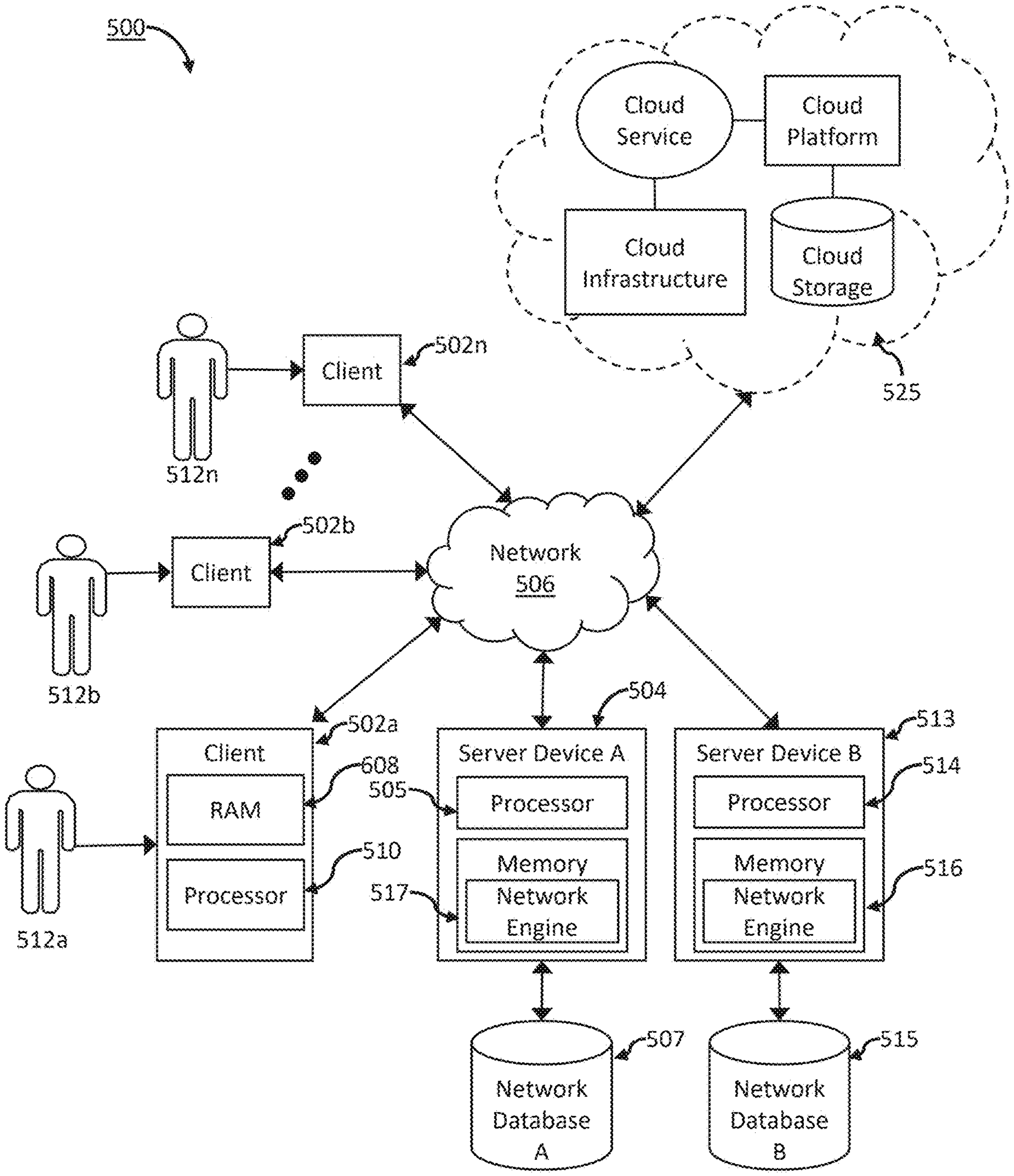

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 502*a*, client device 502*b* through client device 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client device 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 502*a* through 502*n* may also comprise a number of external or internal devices such as a mouse, a CD-ROM, DVD, a physical or virtual keyboard, a display, or other input or output devices. In some embodiments, examples of client devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, client devices 502*a* through 502*n* may be specifically programmed with one or more application programs in accordance with one or more principles/methodologies detailed herein. In some embodiments, client devices 502*a* through 502*n* may operate on any operating system capable of supporting a browser or browser-enabled application, such as Microsoft™, Windows™, and/or Linux. In some embodiments, client devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, user 512*a*, user 512*b* through user 512*n*, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more client devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
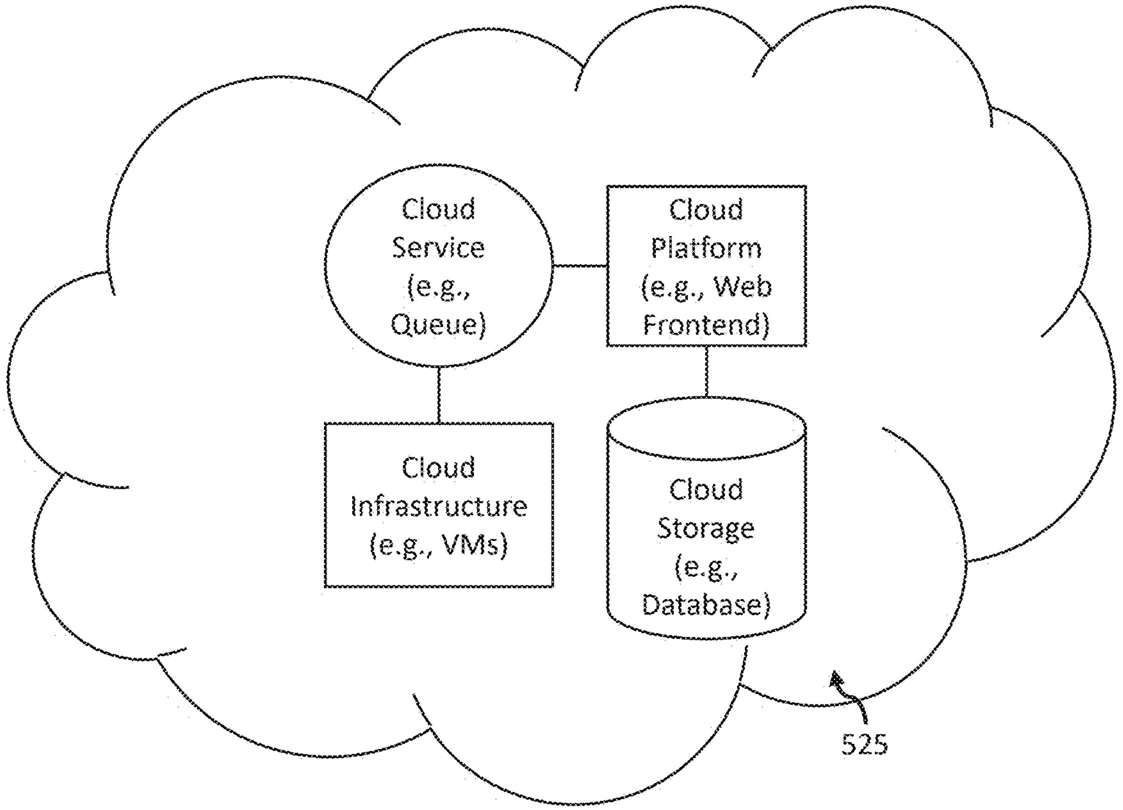
Figure 7:
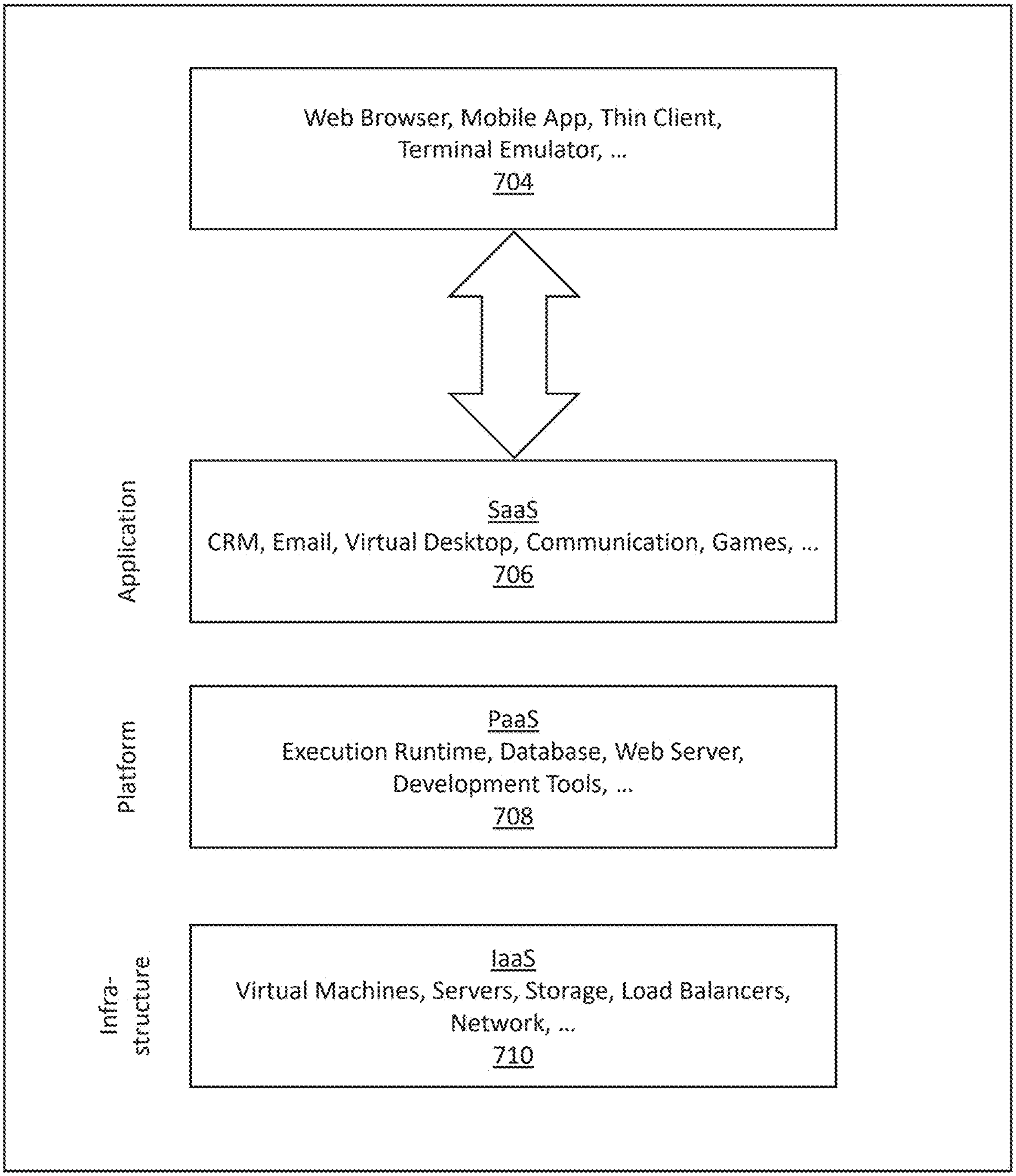

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method, comprising:
   - accessing, by at least one processor, a digital map of a project site, the project site having a work surface in at least one area of the project site;
   - identifying, by the at least one processor, at least one sub-area of the area, wherein the at least one sub-area is associated with at least one wear pattern on the work surface;
   - determining, by the at least one processor, at least one coating technology and at least one dry film thickness (DFT) for the at least one sub-area based at least in part on the at least one wear pattern of the at least one sub-area;

mapping, by the at least one processor, the at least one sub-area onto a digital map of the project site to assign the at least one coating technology and the at least one DFT to the at least one sub-area within the project site.

2. A method comprising:

receiving, by at least one processor, at least one digital map of a project site, wherein the at least one digital map maps at least one sub-area of an area of a work surface onto the project site;

wherein the at least one sub-area comprises at least one assignment of at least one coating technology and at least one dry film thickness (DFT) based on at least one wear pattern of the at least one sub-area;

converting, by the at least one processor, a first coordinate system of the digital map to a project site-specific coordinate system;

monitoring, in real-time, by the at least one processor, a location of a material application vehicle using at least one radio system configured to obtain location data from at least one satellite positioning system;

controlling, by the at least one processor, the material application vehicle, based on the location, to:

traverse the work surface according to the digital map based at least in part on the project site-specific coordinate system;

apply the at least one coating technology to the at least one sub-area assigned to the at least one coating technology based at least in part on the digital map and the location;

receiving, by the at least one processor, sensor data from at least one sensor configured to measure at least one application rate of the at least one coating technology;

determining, by the at least one processor, at least one measured DFT of the at least one coating technology based at least in part on the sensor data;

determining, by the at least one processor, the at least one DFT at the location of the material application vehicle based at least in part on the digital map; and adjusting, in real-time, by the at least one processor, an application rate of the at least one coating technology based at least in part on the location, the digital map and the at least one measured DFT.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method, comprising:

accessing, by at least one processor, a digital map of a project site, the project site having a work surface in at least one area of the project site;

identifying, by the at least one processor, at least one sub-area of the area, wherein the at least one sub-area is associated with at least one wear pattern on the work surface;

determining, by the at least one processor, at least one coating technology and at least one dry film thickness (DFT) for the at least one sub-area based at least in part on the at least one wear pattern of the at least one sub-area; and mapping, by the at least one processor, the at least one sub-area onto a digital map of the project site to assign the at least one coating technology and the at least one DFT to the at least one sub-area within the project site.

2. The method of claim 1, further comprising:

obtaining, by the at least one processor, during a first time period prior to a start of application of the at least one coating technology to the project site, at least one measurement of at least one parameter of an operation of a vehicle configured to apply the at least one coating technology to the at least one sub-area; and generating, by the at least one processor, a calibrated baseline of operation of the vehicle based at least in part on the at least one measurement.

3. The method of claim 2, further comprising:

obtaining, by the at least one processor, in response to the application of the at least one coating technology to the project site, at least one subsequent measurement of the at least one parameter of the operation of the vehicle; and determining, by the at least one processor, an anomaly in the operation of the vehicle based at least in part on a comparison of the at least one subsequent measurement and the calibrated baseline of operation of the vehicle.

4. The method of claim 2, further comprising:

modelling, by the at least one processor, with at least one model, the at least one measurement of the at least one parameter to generate the calibrated baseline.

5. The method of claim 4, wherein the least one model comprises at least one of at least one statistical model for at least one machine learning model.

6. The method of claim 1, wherein the wear pattern comprises at least one of observed wear on an existing coating of the work surface or a predicted wear on a to-be-applied coating.

7. The method of claim 1, further comprising:

determining, by the at least one processor, a quantity of the at least one coating technology to be deposited per distance to achieve the at least one DFT in the at least one sub-area;

determining, by the at least one processor, a vehicle speed and a pump motor speed based at least in part on the quantity; and mapping, by the at least one processor, the vehicle speed and the pump motor speed to the at least one sub-area of the project site so as to achieve the at least one DFT in the at least one sub-area.

8. A method comprising:

receiving, by at least one processor, at least one digital map of a project site, wherein the at least one digital map maps at least one sub-area of an area of a work surface onto the project site;

wherein the at least one sub-area comprises at least one assignment of at least one coating technology and at least one dry film thickness (DFT) based on at least one wear pattern of the at least one sub-area;

converting, by the at least one processor, a first coordinate system of the digital map to a project site-specific coordinate system;

monitoring, in real-time, by the at least one processor, a location of a material application vehicle using at least one radio system configured to obtain location data from at least one satellite positioning system;

controlling, by the at least one processor, the material application vehicle, based on the location, to:

traverse the work surface according to the digital map based at least in part on the project site-specific coordinate system;

apply the at least one coating technology to the at least one sub-area assigned to the at least one coating technology based at least in part on the digital map and the location;

receiving, by the at least one processor, sensor data from at least one sensor configured to measure at least one application rate of the at least one coating technology;

determining, by the at least one processor, at least one measured DFT of the at least one coating technology based at least in part on the sensor data;

determining, by the at least one processor, the at least one DFT at the location of the material application vehicle based at least in part on the digital map; and adjusting, in real-time, by the at least one processor, an application rate of the at least one coating technology based at least in part on the location, the digital map and the at least one measured DFT.

9. The method of claim 8, further comprising:

obtaining, by the at least one processor, during a first time period at a start of applying the at least one coating technology to the project site, at least one measurement of at least one parameter of an operation of the material application vehicle configured to apply the at least one coating technology to the at least one sub-area; and generating, by the at least one processor, a calibrated baseline of operation of the material application vehicle based at least in part on the at least one measurement.

10. The method of claim 9, further comprising:

obtaining, by the at least one processor, after the first time period, at least one subsequent measurement of the at least one parameter of the operation of the material application vehicle; and determining, by the at least one processor, an anomaly in the operation of the material application vehicle based at least in part on a comparison of the at least one subsequent measurement and the calibrated baseline of operation of the vehicle.

11. The method of claim 9, further comprising:

modelling, by the at least one processor, with at least one model, the at least one measurement of the at least one parameter to generate the calibrated baseline.

12. The method of claim 11, wherein the least one model comprises at least one statistical model.

13. The method of claim 11, wherein the at least one model comprises at least one machine learning model.

14. The method of claim 11, further comprising:

determining, by the at least one processor, a quantity of the at least one coating technology to be deposited per distance to achieve the at least one DFT in the at least one sub-area;

determining, by the at least one processor, a vehicle speed and a pump motor speed based at least in part on the quantity; and controlling, by the at least one processor, the material application vehicle, based on the vehicle speed and the pump motor speed in the at least one sub-area of the project site so as to achieve the at least one DFT in the at least one sub-area.

15. A system comprising:

at least one processor in communication with at least one non-transitory computer readable medium having computer software instructions stored thereon, wherein the at least one processor, upon execution of the computer software instructions is configured to:

receive at least one digital map of a project site, wherein the at least one digital map maps at least one sub-area of an area of a work surface onto the project site;

wherein the at least one sub-area comprises at least one assignment of at least one coating technology and at least one dry film thickness (DFT) based on at least one wear pattern of the at least one sub-area;

convert a first coordinate system of the digital map to a project site-specific coordinate system;

monitor, in real-time, a location of a material application vehicle using at least one radio system configured to obtain location data from at least one satellite positioning system;

control the material application vehicle, based on the location, to:

traverse the work surface according to the digital map based at least in part on the project site-specific coordinate system;

apply the at least one coating technology to the at least one sub-area assigned to the at least one coating technology based at least in part on the digital map and the location;

receive sensor data from at least one sensor configured to measure at least one application rate of the at least one coating technology;

determine at least one measured DFT of the at least one coating technology based at least in part on the sensor data;

determine the at least one DFT at the location of the material application vehicle based at least in part on the digital map; and adjust, in real-time, an application rate of the at least one coating technology based at least in part on the location, the digital map and the at least one measured DFT.

16. The system of claim 15, wherein the at least one processor, upon execution of the computer software instructions is further configured to:

obtain, during a first time period at a start of applying the at least one coating technology to the project site, at least one measurement of at least one parameter of an operation of the material application vehicle configured to apply the at least one coating technology to the at least one sub-area; and generate a calibrated baseline of operation of the material application vehicle based at least in part on the at least one measurement.

17. The system of claim 16, wherein the at least one processor, upon execution of the computer software instructions is further configured to:

obtain, after the first time period, at least one subsequent measurement of the at least one parameter of the operation of the material application vehicle; and determine an anomaly in the operation of the material application vehicle based at least in part on a comparison of the at least one subsequent measurement and the calibrated baseline of operation of the vehicle.

18. The system of claim 16, wherein the at least one processor, upon execution of the computer software instructions is further configured to:

model, with at least one model, the at least one measurement of the at least one parameter to generate the calibrated baseline.

19. The system of claim 18, wherein the least one model comprises at least one of:

at least one statistical model, or at least one machine learning model.

20. The system of claim 15, wherein the at least one processor, upon execution of the computer software instructions is further configured to:

determine a quantity of the at least one coating technology to be deposited per distance to achieve the at least one DFT in the at least one sub-area;

determine a vehicle speed and a pump motor speed based at least in part on the quantity; and control the material application vehicle, based on the vehicle speed and the pump motor speed in the at least one sub-area of the project site so as to achieve the at least one DFT in the at least one sub-area.

* * * * *